Patented Dec. 19, 1950

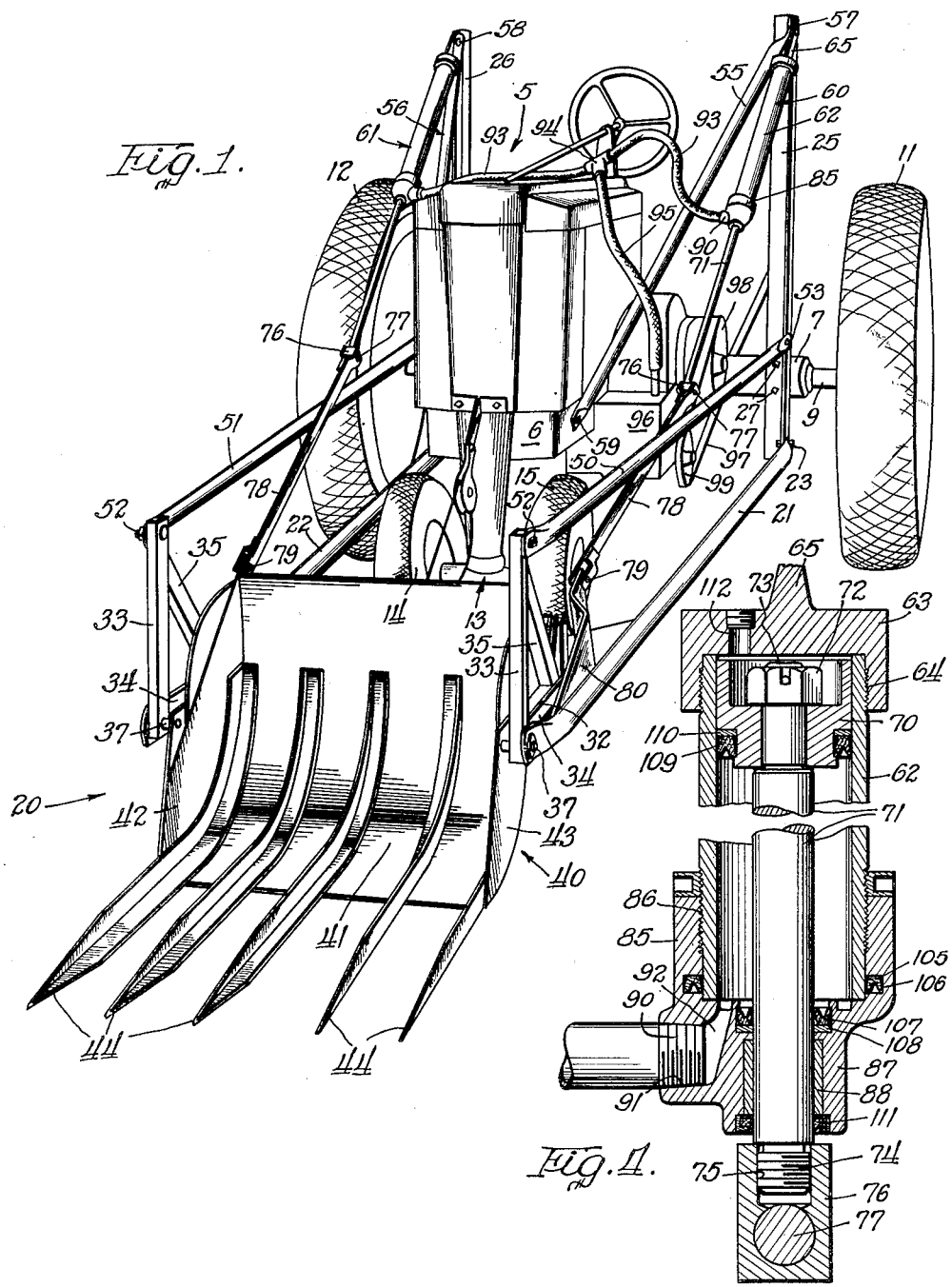

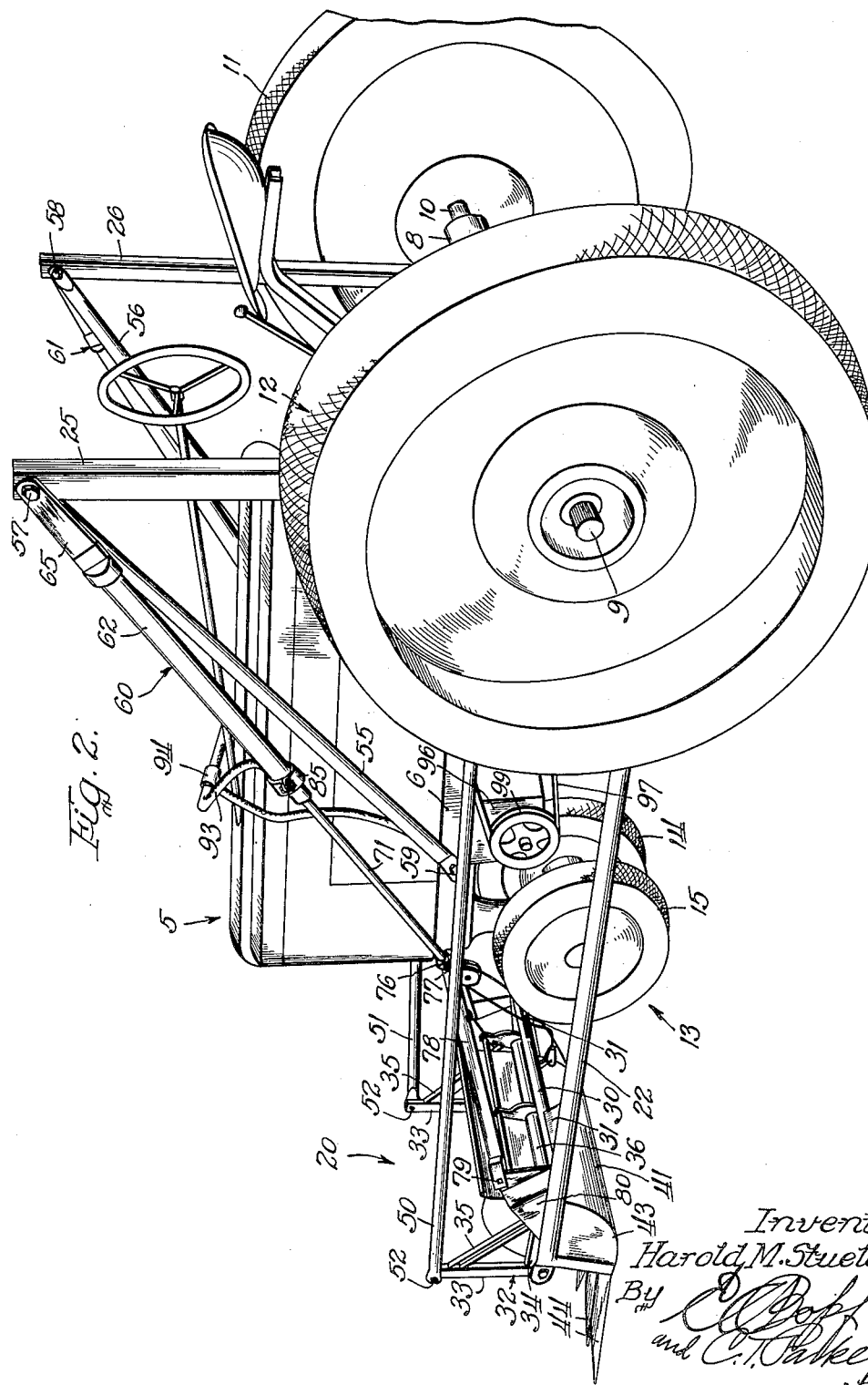

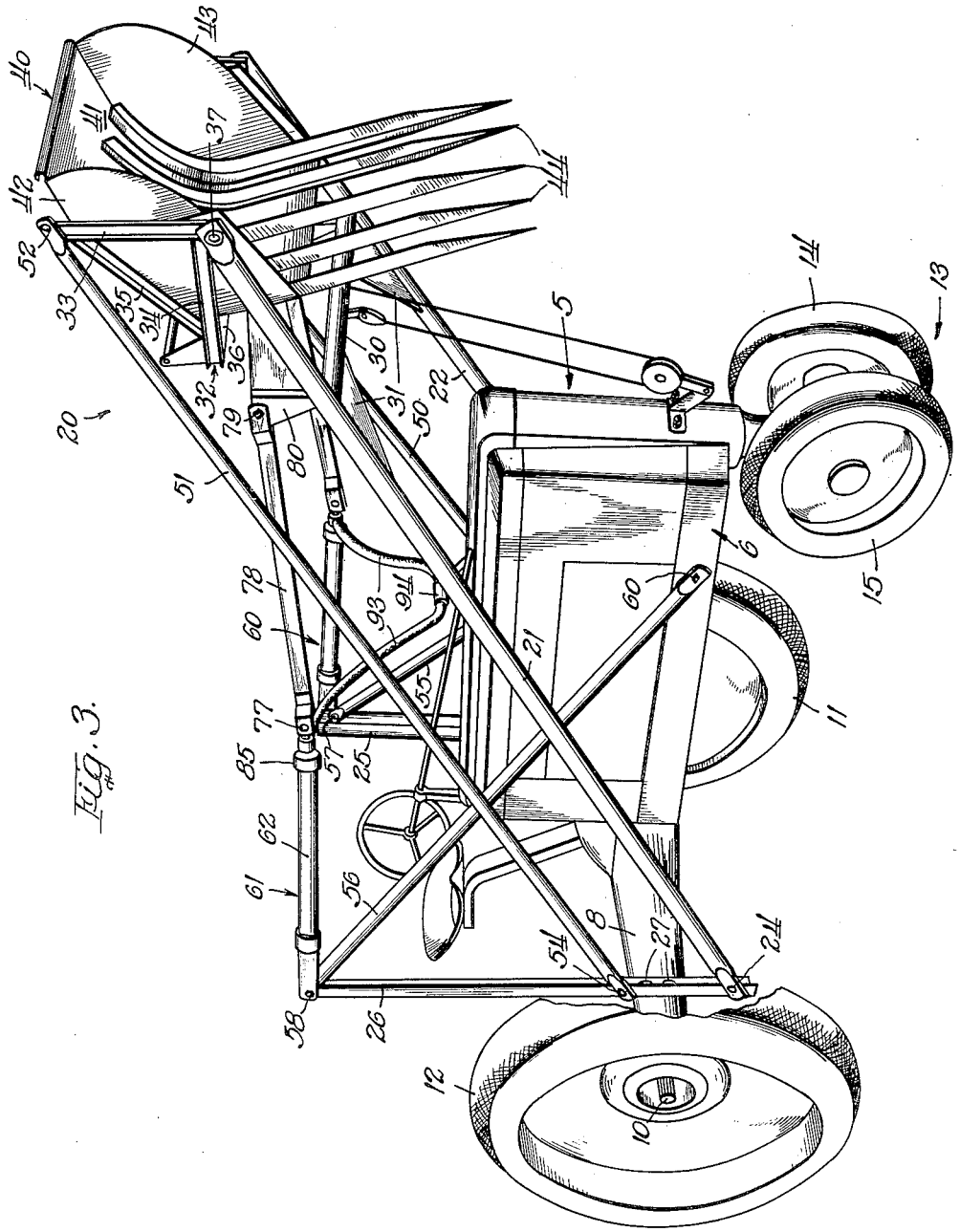

2,534,886

UNITED STATES PATENT OFFICE 2,534,886

HYDRAULIC POWER SHOVEL LOADER

Harold M. Stueland, East Moline, Ill., assignor to Deere & Company, Moline, Ill., a corporation of Illinois Application March 10, 1947, Serial No. 733,495

1 Claim. (Cl. 214—140)

The present invention relates generally to loaders and more particularly to tractor mounted loaders of the type comprising a material moving tool disposed at the forward end of the tractor and mounted on arms which extend rearwardly alongside the tractor body. Loaders of this type receive power from the tractor engine for raising and lowering the tool. The power is transmitted to the supporting arms either through cables wound on drums driven through a friction clutch, or through hydraulic rams receiving fluid under pressure from a hydraulic pumping unit driven by the tractor engine. In my co-pending application, Serial No. 652,504, filed March 7, 1946, now Patent No. 2,489,469 granted November 29, 1949, I have disclosed a tractor mounted loader of this type which is provided with a cable and drum mechanism for raising the arms and bucket. The principal object of the present invention relates to the provision of a novel and improved hydraulic ram mechanism for raising and lowering the arms. More specifically, it is an object of the present invention to provide a hydraulic lifting mechanism including rams which can be substituted directly for the cables shown in my co-pending application, without the necessity for additional force transmitting levers or the like.

Heretofore it has been general practice to provide hydraulic ram lifting mechanism which pushes the bucket supporting arms upwardly as the ram extends in length. On the other hand, cable lifting mechanism must necessarily extend upwardly over pulleys to act in tension to pull the arms upwardly when raising the bucket.

Specifically, therefore, an object of the present invention relates to the provision of a hydraulic ram mechanism which is stressed in tension to lift the arms and bucket by a contraction of the ram, thus permitting the ram to be attached to the arms and the frame structure at the same points of connection that are used for the cable lifting mechanism.

These and other objects and advantages of my invention will be apparent to those skilled in the art after a consideration of the following description, in which reference is had to the drawings appended hereto, in which Figure 1 is a perspective view looking toward the forward end of a tractor with a loader mounted thereon embodying the principles of the present invention;

Figure 2 is a perspective view looking toward the side and rear of the tractor mounted loader;

Figure 3 is a perspective view looking toward the side and front of the implement, showing the loader in raised dumping position; and Figure 4 is a sectional view taken along the major axis of one of the hydraulic raising cylinders, drawn to an enlarged scale, showing the piston in full raised position and with an intermediate portion of the ram broken away to conserve space in the drawing.

Referring now to the drawings, the tractor is indicated generally by reference numeral 5 and is a conventional tricycle type tractor comprising a narrow longitudinally extending frame or body 6 carried on a pair of laterally oppositely extending rear axle housings 7, 8, within which are journaled a pair of drive axles 9, 10 supported on a pair of traction wheels 11, 12, respectively. The forward end of the tractor is carried on a dirigible wheeled truck 13 including a pair of closely spaced dirigible supporting wheels 14, 15.

The loader is indicated in its entirety by reference numeral 20 and includes a pair of main supporting arms or beams 21, 22 extending longitudinally along opposite sides of the tractor body 6, respectively, and swingably connected by a pair of transversely aligned pivots 23, 24 at their rear ends to the lower ends of a pair of upright supports in the form of vertical mast members 25, 26 secured to the tractor axle housings 7, 8, respectively, by removable bolts 27 in a manner well known to those skilled in the art. Each of the mast members 25, 26 is preferably in the form of a structural angle member, and it will be noted that the masts extend appreciably below the level of the tractor axles 9, 10 and also extend upwardly to a height which is low enough to permit the implement to move through the door of any barn or shed.

The main supporting arms 21, 22 are rigidly interconnected by a transverse tubular bracing member 30, preferably welded thereto, and having triangular gusset plates 31 interconnecting the arms and bracing member to form a rigid structure. The arms 21, 22 extend forwardly beyond the brace 30 and carry between them a tool supporting frame 32. The frame 32 includes a pair of end portions, each including a vertical channel member 33, a generally horizontal channel member 34, and an inclined channel member 35, the three channel members being rigidly secured together in a triangular shape, preferably by welding, and the rear ends of the two generally horizontal channel members 34 are interconnected by a transverse tubular frame member 36, rigidly welded at opposite ends thereof, respectively, to the two frame members 34. Each of the main supporting arms 21, 22 is connected to the lower end of the adjacent vertical frame member 33 by means of a pair of coaxial pivot pins 37, providing for relative rocking movement of the frame 32 relative to the arms 21, 22 on a transverse axis.

Thus, the frame 32 is generally U-shape and serves as a supporting cradle for a material handling tool in the form of a bucket 40 having a curved plate 41 serving as a bottom and back wall, and a pair of laterally spaced generally vertical side plates 42, 43. The bucket is provided with a plurality of laterally spaced digging teeth 44, each of which comprises a structural angle member curved along the inside of the bottom plate 41 and extending forwardly from the forward edge of the latter, the forward points of the teeth 44 being sharpened to facilitate engaging the pile of material to be handled. The pivot pins 37 are rigidly mounted on the side plates 42, 43 of the bucket, respectively, providing for rocking movement of the bucket 40 about the transverse axis of the pivot pins 37 relative to the cradle or frame 32 and also relative to the supporting arms 21, 22.

The bucket 40 is normally latched to the cradle or frame 32 by latch mechanism which will not be described herein, inasmuch as it is not an essential part of the present invention, and furthermore is specifically disclosed and claimed in my above mentioned co-pending application.

A pair of upper supporting arms or links 50, 51 are pivotally connected at their forward ends by pivot bolts 52 to the upper ends of the vertical frame members 33, respectively, the pivot pins 52 being disposed on a common transverse axis. The control links 50, 51 extend rearwardly above and parallel to the main supporting arms 21, 22, respectively, and for the purpose of the present disclosure, may be considered to be pivotally connected at their rear ends to the masts 25, 26, respectively, by means of pivot bolts 53, 54, although my above identified co-pending application discloses means for adjusting the links fore and aft to provide a tilting adjustment of the bucket.

Thus, the bucket supporting frame 32 is carried on two pairs of vertically spaced, substantially parallel arms 21, 50 and 22, 51 disposed along opposite sides of the tractor body 6, so that as the arms are raised and lowered the bucket teeth 44 remain at a constant angle with respect to the ground.

The upper ends of the masts 25, 26 are braced by a pair of inclined bracing members 55, 56, connected by pins 57, 58 at their upper ends to the upper ends of the masts 25, 26, respectively, and converging forwardly and downwardly and are secured by bolts 59, 60 at their forward ends to the sides of the tractor body 6.

The main supporting arms 21, 22 are raised and lowered to raise and lower the bucket 40, by means of a pair of extensible hydraulic rams 60, 61, respectively. Each of the ram units comprises a hydraulic cylinder 62, one end of which is provided with a cap 63 threaded at 64 over the upper end of the cylinder and provided with an axially extending supporting ear 65, which is pivotally connected to the upper end of the associated mast by the respective bolts 57, 58. A piston 70 is slidably disposed within the cylinder 62 and is mounted on the upper end of a piston rod 71 and secured to the latter by a bolt 72 threaded on the reduced threaded end portion 73 of the rod 71. The piston rod 71 extends outwardly through the opposite end of the cylinder 62 and has a threaded end portion 74 of reduced diameter which engages a threaded socket 75 in a connecting block 76. The connecting block 76 is pivotally connected by a pin 77 to the bifurcated rear end of a connecting link 78. The forward end of the link 78 is also bifurcated and pivotally connected by a pin 79 to an upstanding plate 80, which is rigidly fixed, as by welding, to the main supporting arm adjacent the bucket. It will be noted that the pivot pins 77, 79 are disposed on transverse axes, to permit the link 78 and piston rod 71 to buckle in the event that an upward thrust is imposed upon the bucket during operation, as when the bucket is being pushed into a pile of material. This prevents the piston rod 71 from being bent.

The lower end of the cylinder 62 is provided with a sleeve casting 85, which is threaded to engage the lower threaded end of the cylinder 62, as indicated at 86. The casting is provided with a lower sleeve portion 87 which embraces the piston rod 71 and is provided with a sleeve bushing 88 which slidably engages the piston rod to center the latter.

Fluid is supplied under pressure through a pipe 90, which is connected to a threaded aperture 91 in the sleeve casting 85, communicating through a passage 92 with the interior of the cylinder 62. The pipe 90 is connected through a flexible hose 93 to a T-fitting 94 adapted to receive the two flexible hoses 93 from the two rams 60, 61 and also a supply hose 95 from a hydraulic pumping unit 96. The pumping unit 96 includes suitable fluid pumping means and control means therefor, the details of which are not an essential part of the present invention and therefore need not be disclosed herein in detail. Power is supplied to the pumping unit 96 by means of a V-belt 97 trained over a drive pulley 98 and over a driven pulley 99 on the unit 96. The drive pulley 98 is connected to the power plant of the tractor 5 by any suitable means known to those skilled in the art.

During operation, the tractor is driven forwardly with the bucket 40 in lowered position, as indicated in Figures 1 and 2, to gather a load of material into the bucket. The operator then causes the hydraulic unit 96 to force fluid under pressure to the supply duct 95, the flexible hoses 93 and the passages 92 into the two cylinders 62 between the piston 70 and the bearing sleeve 87. This causes the piston 70 to be forced upwardly and rearwardly through the cylinder 62 to contract the ram and draw the piston rod 71 into the cylinder, thereby exerting a tensional force upon the link 78 and connecting plate 80 to raise the supporting arm and bucket to the required height. The latch mechanism (not shown) is then tripped, allowing the bucket 40 to rock about the axis of the pin 37 into the dumping position shown in Figure 3.

The cylinder is sealed against leakage of hydraulic fluid by means of annular V-shaped seals made of synthetic rubber or other flexible packing material. One of the annular seals 105 is disposed in a groove 106 in the sleeve casting 85 and embraces the end of the cylinder 62 to prevent fluid from leaking through the threaded joint 86. Another annular seal 107 encircles the piston rod 71 and is disposed in a groove 108 in the sleeve portion 87 to prevent fluid from escaping along the piston rod 71. A third fluid seal 109 is disposed in a groove 110 in the piston 70 and bears against the inner surface of the cylinder 62 to prevent leakage of fluid past the piston. An annular felt dust seal 111 is disposed in the outer end of the sleeve portion 87 and wipes against the piston rod 71 to prevent dust from entering the sleeve bushing 88.

A vent hole 112 is provided in the cap 63 communicating with the upper portion of the cylinder 62 above the piston 70 to relieve any pressure that might develop therein, and also to provide for draining any oil which happens to leak past the seal 109.

It will be noted that the hydraulic rams 60, 61 are extended to lower the bucket and contracted to raise the bucket. Thus, the power stroke of the rams occurs during the contracting movement of the rams, causing them to stress the piston rod 71 in tension to raise the bucket. This permits the rams to be substituted for cable mechanism which also acts in tension to raise the bucket and does not require any reversing levers or the like to connect the rams to the arms 21, 22.

The bucket 40 shown in the drawings is designed especially for handling manure, but may also be used for other material as well, such as earth or snow, or other types of earth working tools can be substituted for the bucket 40 in a manner well known to those skilled in the art.

I claim:

A machine of the class described, comprising: a generally longitudinal body having an upright support adjacent one end portion thereof and rigidly secured thereto; beam structure pivotally mounted on a transverse axis at one end portion thereof adjacent the end portion of the body at which the support is located and extending beyond the other end portion of the body; material-handling means carried by the portion of the beam structure that extends beyond the body; fluid pressure apparatus, including a cylinder and a piston, extending downwardly from an upper portion of the support to that portion of the beam structure that carries the material-handling means; means connecting the fluid pressure apparatus at the upper end portion thereof to said upper portion of the support, including a pivot on a transverse axis; and an articulate connection between the lower end portion of the fluid pressure apparatus and a portion of the beam structure adjacent the material-handling means, including means provided for displacement of the lower end portion of the fluid pressure apparatus either upwardly or downwardly about the pivot axis thereof on the support and relative to the beam structure, and further including means restraining the fluid pressure apparatus against lateral displacement relative to the beam structure.

HAROLD M. STUELAND.

REFERENCES CITED

The following references are of record in the file of this patent:

UNITED STATES PATENTS

| Number | Name | Date |
| --- | --- | --- |
| 898,618 | Wolfe | Sept. 15, 1908 |
| 2,134,992 | Whitmire | Nov. 1, 1938 |
| 2,296,827 | Andersen et al. | Sept. 29, 1942 |
| 2,319,921 | Dooley et al. | May 25, 1943 |
| 2,328,715 | Drott | Sept. 7, 1943 |
| 2,348,899 | Guignard et al. | May 16, 1944 |
| 2,363,986 | Mott | Nov. 28, 1944 |
| 2,391,224 | Carter | Dec. 18, 1945 |
| 2,427,968 | Hoover | Sept. 23, 1947 |